US012762561B2

(12) United States Patent

Cocchiarella et al.

(10) Patent No.: US 12,762,561 B2
(45) Date of Patent: Oct. 13, 2026

(54) USER APPLICATION FOR ITEM SCANNING AND SELF-CHECKOUT

(71) Applicant: Maplebear Inc., San Francisco, CA (US)

(72) Inventors: Dominic Cocchiarella, Berkeley, CA (US); Andrew Peters, Tiburon, CA (US); Samuel Slezek, San Diego, CA (US); Spencer Schack, Seattle, WA (US); Aditya Godbole, San Francisco, CA (US); Uzoma Orji, Frisco, TX (US)

(73) Assignee: Maplebear Inc., San Francisco, CA (US)

( * ) Notice: Subject to any disclaimer, the term of this patent is extended or adjusted under 35 U.S.C. 154(b) by 97 days.

(21) Appl. No.: 18/368,482

(22) Filed: Sep. 14, 2023

(65) Prior Publication Data

US 2024/0086927 A1 Mar. 14, 2024

Related U.S. Application Data

(60) Provisional application No. 63/406,658, filed on Sep. 14, 2022.

(51) Int. Cl.

*G06Q 30/06* (2023.01)
*G06Q 20/40* (2012.01)
*G06Q 30/0601* (2023.01)

(52) U.S. Cl.

CPC ..... *G06Q 20/4016* (2013.01); *G06Q 30/0603* (2013.01); *G06Q 30/0633* (2013.01); *G06Q 30/0641* (2013.01)

(58) Field of Classification Search

None

See application file for complete search history.

(56) References Cited

U.S. PATENT DOCUMENTS

| | | | | |
|---|---|---|---|---|
| 7,672,871 | B2 * | 3/2010 | Brenhouse | G06Q 20/20 705/16 |
| 9,218,530 | B2 * | 12/2015 | Davis | H04M 1/72412 |
| 9,330,382 | B2 * | 5/2016 | Argue | G06Q 20/047 |
| 10,402,847 | B2 * | 9/2019 | Marcus | G06Q 30/0234 |
| 10,839,384 | B2 * | 11/2020 | Wong | G06Q 40/00 |
| 2009/0254479 | A1 * | 10/2009 | Pharris | H04L 63/08 455/414.1 |
| 2012/0280040 | A1 * | 11/2012 | Carney | G06Q 20/047 235/383 |
| 2012/0284130 | A1 * | 11/2012 | Lewis | G06Q 40/00 705/16 |
| 2013/0173403 | A1 * | 7/2013 | Grigg | G06Q 20/401 705/16 |

(Continued)

*Primary Examiner* — William J Jacob

(74) *Attorney, Agent, or Firm* — Fenwick & West LLP

(57) ABSTRACT

A device captures an image of a first machine-readable code, sends a request to a server to obtain access to a user application at the device. The device captures an image of an item offered by a retailer, detects information about the item included in the image of the item, and adds the item to a virtual shopping cart. The device receives payment information for purchasing the item in the virtual shopping cart, and generates a second machine-readable code comprising purchase information of the item. The device presents the second machine-readable code to a verification device for verifying the purchase of the item.

18 Claims, 4 Drawing Sheets

(56) References Cited

U.S. PATENT DOCUMENTS

| | | | | |
|---|---|---|---|---|
| 2013/0218721 | A1* | 8/2013 | Borhan | G06Q 30/02 705/26.41 |
| 2013/0256403 | A1* | 10/2013 | Mackinnon Keith | G06Q 20/322 235/375 |
| 2015/0012426 | A1* | 1/2015 | Purves | G02B 27/017 705/41 |
| 2016/0012465 | A1* | 1/2016 | Sharp | G06Q 20/321 705/14.17 |
| 2016/0109954 | A1* | 4/2016 | Harris | G06V 20/20 345/156 |
| 2019/0287093 | A1* | 9/2019 | Perry | G06Q 30/0267 |
| 2022/0103589 | A1* | 3/2022 | Shen | G06Q 40/03 |

* cited by examiner

USER APPLICATION FOR ITEM SCANNING AND SELF-CHECKOUT

CROSS REFERENCE TO RELATED APPLICATION

This application claims the benefit of U.S. Provisional Application No. 63/406,658, filed Sep. 14, 2022, which is incorporated by reference in its entirety.

BACKGROUND

In a traditional checkout process, customers at a physical retailer usually add items to their shopping carts and wait in line to make a payment to purchase the items. This is a time-consuming process. Further, at the checkout station, people need to use a device to scan and record each item picked up for purchase, resulting in redundant activities. The traditional checkout process is labor-intensive for both customers and store employees.

SUMMARY

A scan and pay checkout process allows customers to complete purchases of selected items on a mobile device, thereby eliminating redundant actions and reducing the time required to fulfill an order. For example, customers in a store may download a user application (e.g., using a quick response (QR) code link in the store) and use the user application to scan and add items to the shopping carts while shopping. The customers may then check out from the user application while bypassing a normal point of sale system in the store.

In accordance with one or more aspects of the disclosure, a scan and pay checkout method is presented. The method may include capturing an image of a first machine-readable code by a camera of a user device and sending a request to a server. The method may include accessing a user application at the user device based on a link provided responsive to the request. With the user application, the camera of the user device may capture an image of an item offered by a retailer, and capturing the image may detect information about the item included in the image of the item. The user application receives the detected information about the item and adds the item to a virtual shopping cart. When receiving payment information for purchasing the item in the virtual shopping cart, the user application may generate a second machine-readable code that includes purchase information of the item. The purchase information of the item may include at least the information about the item and the payment information. The user application may further present the second machine-readable code to a verification device for verifying the purchase of the item.

In some embodiments, the machine-readable code is a QR code, and scanning the first machine-readable code causes a selection of a link associated with the QR code. In some embodiments, the QR code may be tied to a store ID for the local retailer so that store-specific information, such as local store pricing, payment gateway selections, and the like, are made available to the customer. Responsive to a selection of the link, the user device may send 404 a request to a server. Responsive to the request, the user device may access a link and download a user application based on the link. Alternatively, the selection of the link associated with the machine-readable code may take the user device to a website accessed in a browser, and the website functions similarly as the user application.

In some embodiments, an image of an item offered by a retailer may include information about the item, and by capturing the image of the item, the user device may detect the information about the item. In some embodiments, the user application may request a user's permission to access the camera on the user client device. In some embodiments, a user may point the camera at a barcode to scan the barcode associated with an item. In some embodiments, the user application may obtain information about the item and display the information in an item information card on a user interface provided by the user application. The item information card may include information of the scanned item, such as, price, size, image, etc. In some embodiments, the item information may be downloaded from cache, and in some embodiments, the item information may be loaded from the online concierge system server.

In some embodiments, the user application includes an image encoder which encodes the contents of the purchase into a machine-readable code, e.g., QR code, which can then be scanned by an employee of the retailer at check-out. In one example, the generated machine-readable code may be included in the receipt presented in the user interface. The user application may direct a user to the audit station before leaving the retailer. In some embodiments, users may be randomly selected for audits; in some embodiments, users may be selected based on an evaluated risk. To select which customers will be audited, a risk evaluation model may be applied to the purchased order to evaluate a risk associated with the purchased order. The risk evaluation model may be a machine learned model or an algorithmic model that includes a set of rules. In some embodiments, the risk evaluation model may be applied to the purchase information to determine a risk score for the purchase of the item, and audit for purchases may be selected based on the determined risk score.

DETAILED DESCRIPTION

Figure 1:
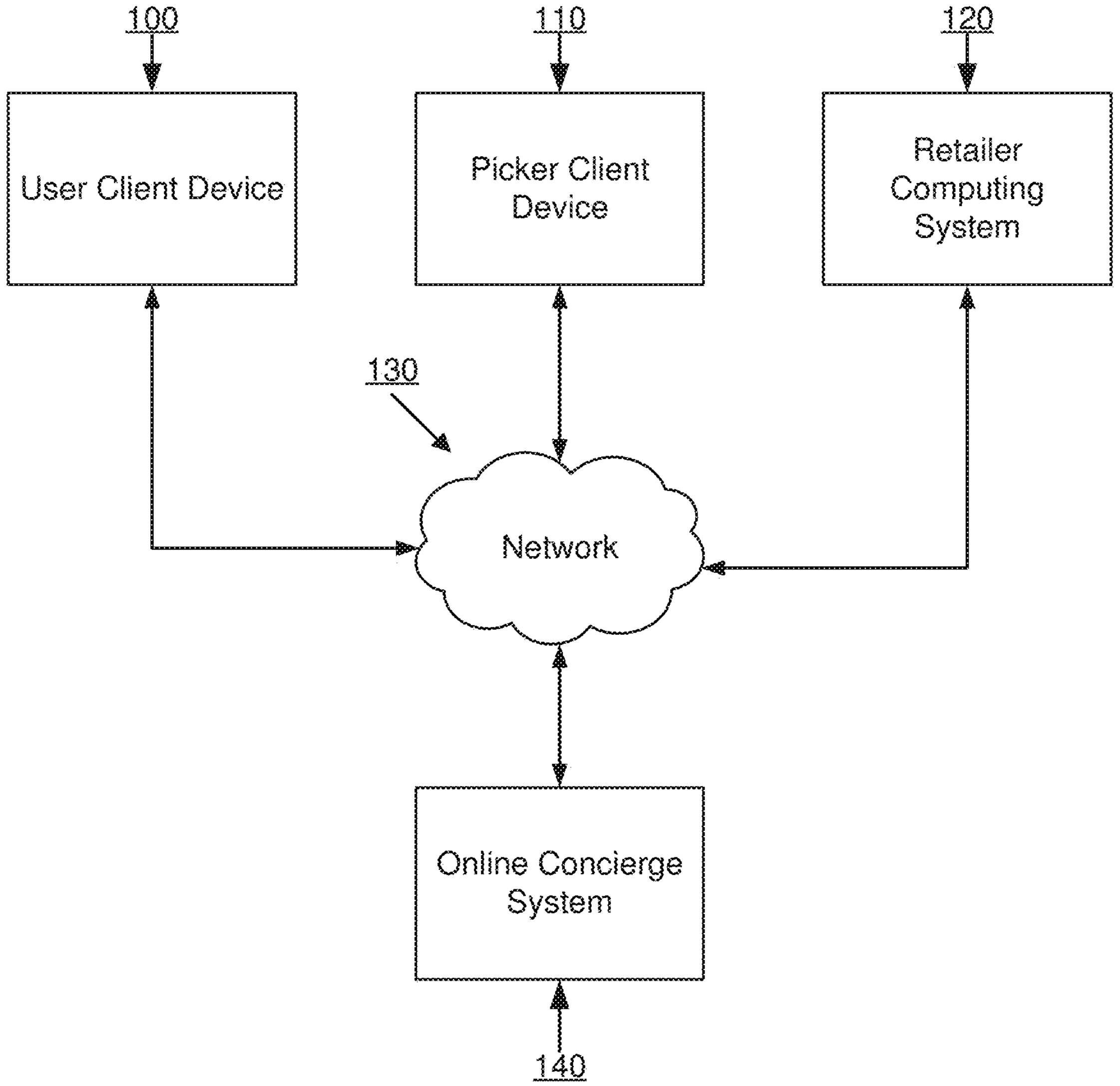
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140. For example, the client application may be a customer mobile application, i.e., an app running on the client device or through a website accessed in a browser.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from a user client device 100 through the network 130. The online concierge system 140 selects a picker to service the user's order and transmits the order to a picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user's client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140. The online concierge system 140 is described in further detail below with regards to FIG. 2.

Figure 2:
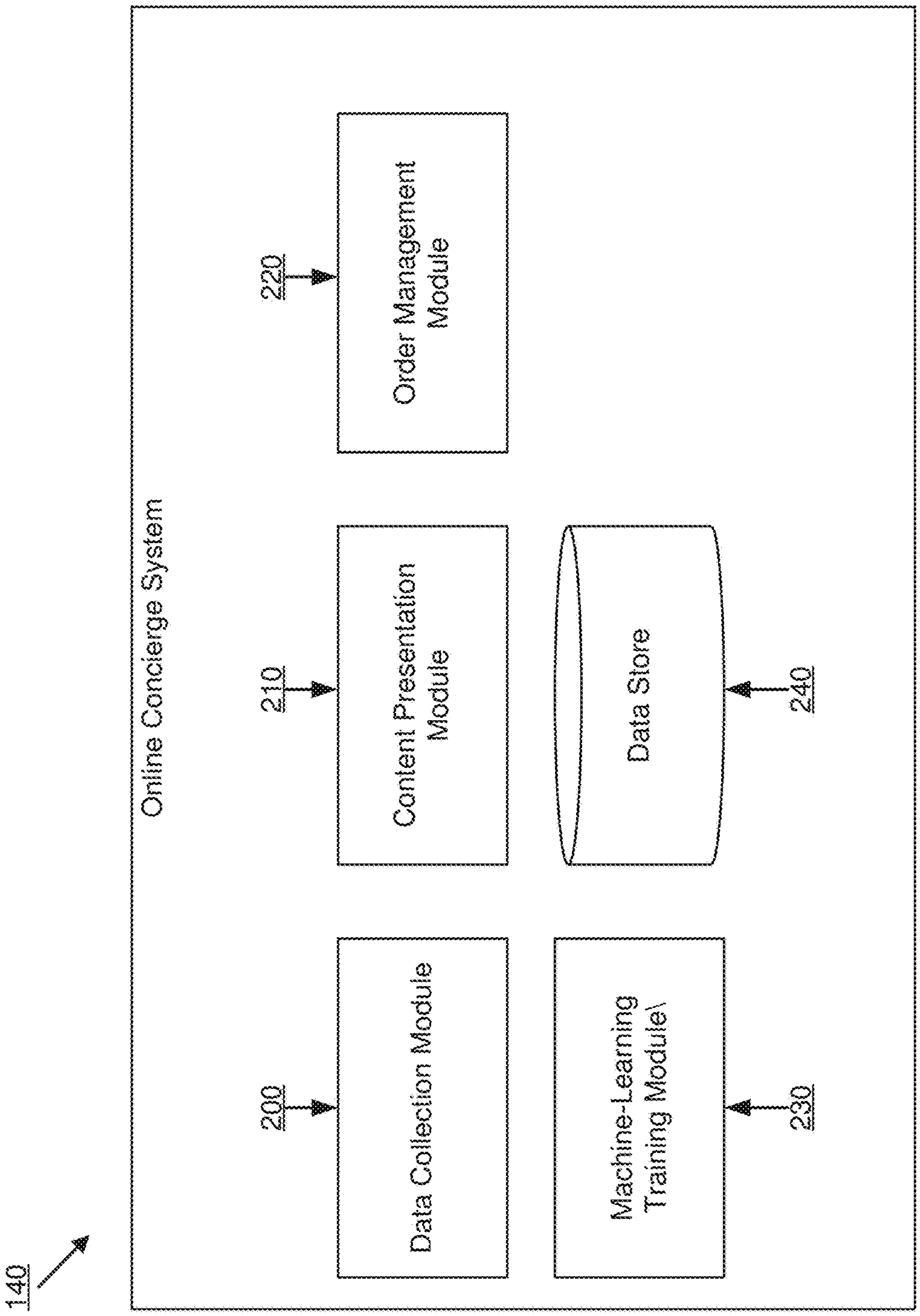
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a user rating for the picker, which retailers the picker has collected items at, or the picker's previous shopping history. Additionally, the picker data may include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a user based on whether the predicted availability of the item exceeds a threshold.

The order management module 220 that manages orders for items from users. The order management module 220 receives orders from a user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3:
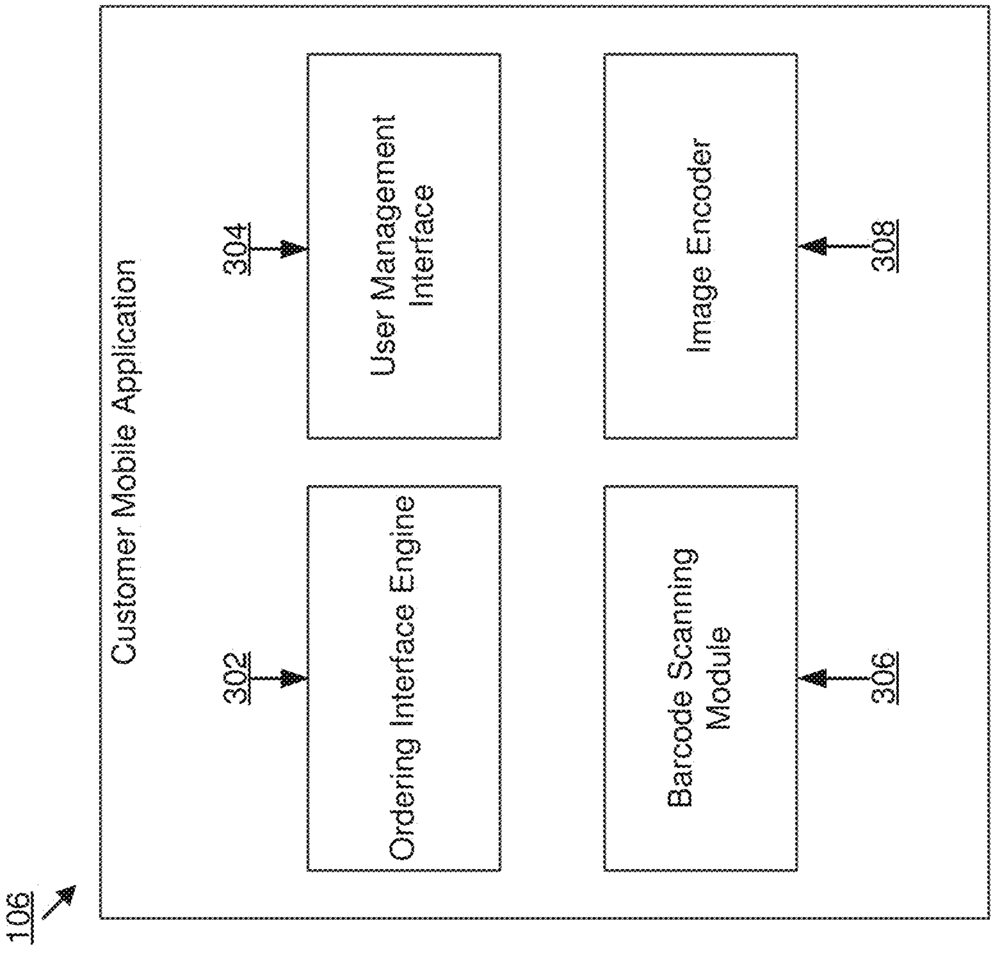
FIG. 3 is a block diagram of the customer mobile application (CMA), according to one or more embodiments.

FIG. 3 is a block diagram of the customer mobile application (CMA) 106, according to one or more embodiments. The customer accesses the CMA 106 via a user client device 100, such as a mobile phone, tablet, laptop, or desktop computer. In some implementations, the customer may obtain the CMA 106 by capturing an image of a machine-readable code, e.g., a QR code, associated with the CMA 106 using a sensor (e.g., a camera) of the user client device 100. Capturing the machine-readable code may cause a selection of link associated with the machine-readable code, and trigger the user client device 100 to send a request to a server (e.g., an App store server). Responsive to the request, the user client device 100 may access a link and download the CMA 106 based on the link. Alternatively, the selection of the link associated with the machine-readable code may take the client device 100 to a website accessed in a browser, and the website functions similarly as the CMA 106. In some embodiments, the user client device 100 may select a QR code via scanning an image that contains the machine-readable code. In some examples, a QR code may be displayed at a retailer. For example, the retailer may print the QR code on posters, handouts, receipts, packages, etc. Alternatively, the retailer may display the QR code on electronic devices. In some cases, a customer may obtain the CMA 106 or capture the QR code via various methods, such as, through emails, text messages, online promotions, and the like.

In one implementation, a retailer may provide in-store signage to promote the CMA 106. For example, the retailer may set up a signage display at the store entrance, showing the image of a QR code associated with the CMA 106. The signage display may also include value proposition information related to features of the CMA 106, e.g., using the CMA 106 is more efficient and convenient, and saves check-out time, etc. In some embodiments, the QR code may be tied to a store ID for the local retailer so that store-specific information, such as local store pricing, payment gateway selections, and the like, are made available to the customer. A customer may scan the QR code using the user client device 100 (e.g., a camera on the user client device 100) and trigger a link associated with the QR code. In some embodiments, the QR code link may take the user client device 100 to a headless web page. A web application appears and includes an education screen to provide information on how to use the CMA 106. Alternatively, scanning the QR code may take the user client device 100 to an App store so that the user client device 100 may download the CMA 106 from the App store. The CMA 106 may load a catalog of items in the local retailer in the background, and customers may use the CMA 106 to add items to the shopping cart by scanning the items in the retailer.

The CMA 106 includes an ordering interface engine 302, which provides an interactive interface, known as a customer ordering interface, with which a customer can browse through and select products and place an order. In some embodiments, the CMA 106 may request a customer's location permission to obtain the customer's location information. For example, the ordering interface engine 302 may present a pop-up user interface element, a calls-to-action (CTA) user interface element, and the like, to request the customer's location permission. For example, the user interface elements may ask the customer to choose among "allow while using app," "allow once," and "don't allow" as a response to the request of allowing the CMA 106 to access the customer's location information. In some embodiments, the CMA 106 may stop obtaining the customer's location information when the customer is outside the store. Once the customer grants the permission to the CMA 106, the CMA 106 may obtain the customer's location information to provide information related to the local retailer store to the customer, such as discounts, promotions, products availabilities, and the like. In some embodiments, the CMA 106 may automatically identify the retailer based on the customer's location information. In some embodiments, the location information may be obtained via the QR code. In some examples, a customer's location may be not matched with the location information from the QR code, and the CMA 106 may not identify a local store for a retailer and use default information of the retailer instead.

The CMA 106 also includes a user management interface 304 which allows the customer to manage basic information associated with his/her account, such as his/her payment instruments. In some embodiments, the CMA 106 may present a user interface element that allows the customer to input account information, e.g., log-in information. In this way, the CMA 106 may access the customer's information associated with the account, for example, user preference, purchase history, membership, reward points, stored payment information, and the like.

The CMA 106 includes a barcode scanning module 306 which allows a customer to scan an item at a retailer (such as a can of soup on the shelf at a grocery store). In some embodiments, the CMA 106 may request a customer's permission to access the camera on the user client device 100. For example, the CMA 106 may present a pop-up user interface element to request the customer's permission. A customer may tap the user interface element to allow the CMA 106 to access the camera. In some embodiments, a customer may point the camera at a barcode to scan the barcode associated with an item. The barcode may be printed on the package of the item, displayed on a print-out nearby, etc. When the CMA 106 scans a barcode, the CMA 106 may provide a confirmation notification to the customer, e.g., by playing a notification sound, showing an item information card on a user interface provided by the CMA 106, etc. The item information card may include information of the scanned item, such as, price, size, image, etc. In some embodiments, the item information may be downloaded from cache, and in some embodiments, the item information may be loaded from the online concierge system 140 server. In some embodiments, the CMA 106 may directly add the scanned item to the shopping cart; alternatively, the CMA 106 may allow the customer to modify the scanned item before adding it to the shopping cart. For example, the CMA 106 may allow the customer to change the quantity of the scanned item, or cancel the scanned item before adding it to the shopping cart. In some embodiments, the barcode scanning module 306 may also include an interface which allows the customer to manually enter information describing an item (such as its serial number, SKU, quantity and/or weight) if a barcode is not available to be scanned.

In some implementations, a retailer may provide in-store signage for irregular items that may require additional information for purchasing. For example, in a produce department, a customer needs to obtain the weight information for purchasing the produce, such as fruits and vegetables. In-store signage may be used to provide educational information to the customer explaining how to use the CMA 106 and a store provided scale to obtain the weight of the produce. In some embodiments, the CMA 106 may provide the educational information in a user interface element. In one implementation, the educational information may instruct the customer to place the to-be-purchased item on the scale to weigh the to-be-purchased item. A display may be coupled to the scale that displays the weight of the item and a barcode associated with the measured weight. By scanning the barcode using the user client device 100, the customer may input the weight of the to-be-purchased item into the CMA 106.

In one example, a customer may plan to purchase a couple of oranges. The customer may start with scanning a barcode associated with the orange. The barcode may be presented in a sticker on an orange, or a label on the shelf, and like. By scanning the barcode, the CMA 106 is triggered to display an item information card of the orange on a user interface. The item information card may include information of the orange, such as, price, size, image, etc. In one example, the price of the orange is listed as price per weight, and the customer needs to input the weight of the oranges. The CMA 106 may display the educational information to instruct the customer to use a scale to obtain the weight of the oranges. The CMA 106 may display the educational information on a scanner screen, e.g., using a pop-up user interface element. Following the educational information, the customer places the to-be-purchased oranges on the scale, and the scale measures the weight of the oranges and generates a barcode presented on a display that is coupled to the scale. The customer uses the user client device 100 to scan the barcode on the scale and obtains the corresponding weight information. The CMA 106 may update the information card of the oranges based on the received weight information. For example, the CMA 106 may display/add the weight, total cost of the oranges to the information card displayed on the user interface. The customer may confirm the information card, e.g., by accepting the weight, total cost of the oranges, etc., and the to-be-purchased oranges may be added to the shopping cart.

Referring back to the ordering interface engine 302, customers may view their selected items and orders and make payments using a customer ordering interface provided by the ordering interface engine 302. In some embodiments, customers may also view and select recommended items to add to their shopping cart via the customer ordering interface. Recommended items are items that would complement the items in a customer's shopping cart, and the online concierge system determines recommended items by analyzing one or more items in the shopping cart. For example, the online concierge system may determine, based on a list of items in a customer's online shopping cart, that "tomato" would complement the items given that the shopping cart includes "basil" and "pasta."

In some embodiments, recommendations may be made to replace a scanned item, for example, replacing a scanned item with products that can be alternatively used instead of the scanned item and have similar characteristics to the scanned product. In one example, a customer scans the barcode for "California oranges," and the online concierge system may recommend "Texas oranges" due to a better promotion. The online concierge system 140 may identify an item (e.g., a product) for an order from a customer and determine a set of candidate replacement products for the scanned item. In some embodiments, a replacement condition may be established to determine whether to identify a scanned item for replacement. When the replacement condition for an item in the order is met, the online concierge system 140 may be triggered to identify a set of candidate replacement products for the scanned item. In some embodiments, the online concierge system 140 applies a replacement model to predict a set of candidate replacement products for the scanned item. The online concierge system 140 may also use the replacement model to label a product based on a hierarchical taxonomy (e.g., labeling the product based on how replacements for the product are labeled). The replacement model is configured to predict a likelihood that a product is a replacement for an input product. The replacement model may be a machine learning model, such as a deep neural network, a regression model, a classifier, or any other suitable type of machine learning model. In some embodiments, the replacement model is a query system that queries a graph database of historical data describing replacements for products. The historical data may describe search queries entered by customers via the CMA 106 and products viewed and/or ordered as a result of each search query. The ordering interface engine 302 presents the set of candidate replacement products in the customer ordering interface for the customer to interact, e.g., add, delete, select, modify the items and the shopping cart.

In some embodiments, the ordering interface engine 302 provides a user interface displaying the shopping cart information to the customer. The user interface may display a list of scanned items, with their corresponding information, such as names, image, size, price per unit, weight, total cost, and the like. In some embodiments, the user interface includes one or more user interface elements that allow customers to interact with so that the customers may modify the items in the shopping cart, for example, changing quantities, adding/removing items, select items in the shopping cart to access a larger image/additional information to verify the scanned items.

As a customer proceeds to make a payment, for example, by clicking/tapping "place order," the ordering interface engine 302 may provide a payment interface that displays/requests payment information. For example, the user interface may request the customer to select a payment method, such as, checkout with credit card, buy with Apple Pay™, Google Pay™, and the like. In some embodiments, the CMA 106 may charge a payment instrument associated with a customer when he/she places an order. The CMA 106 may transmit payment information to an external payment gateway or payment processor. In some embodiments, the CMA 106 stores payment and transactional information associated with each order in a transaction records database in the data store 240.

In some embodiments, the user interface may further request email address, phone number or other contact methods for communication, such as sending order confirmation, receipt, notification, etc. After the customer places the order, the ordering interface engine 302 may generate a user interface displaying the receipt. The receipt may include information associated with the order, such as, date, time, store ID, store location, list of items, total cost, etc. In some embodiments, the CMA 106 also includes an image encoder 308 which encodes the contents of the order into an image. For example, the image encoder 308 may encode the receipt information (with an identification of each item) into a machine-readable code, e.g., a QR code, which can then be scanned by an employee of the retailer at check-out. In one example, the generated machine-readable code may be included in the receipt presented in the user interface.

In some embodiments, an audit station may be provided to verify the purchase information, for example, the payment information, items in the order, etc. In some implementations, the audit station may be located at an exit area of a retailer. An audit station may comprise one or more stands, and each stand may be used to verify (e.g., audit) a purchase at a time. In one or more embodiments, the audit station comprises a tablet on a stand. A camera on the audit station (e.g., part of the tablet) is used to scan a machine-readable code (e.g., QR code) included in the customer's receipt. This may use a barcode capture accessory, which is effectively a mirror that fits on the back of the tablet that allows the camera to scan directionally downward to make it easier for customers to hold their phone to the scanner. The stand may also use a front camera on the tablet to show customers that they are being monitored, e.g., as an ongoing theft deterrent. In some embodiments, an in-store associate may also staff the audit station. This associate will have a separate device to be used for verifications.

The CMA 106 may direct customers to the audit station before leaving the retailer. In some embodiments, customers may be randomly selected for verification; in some embodiments, customers may be selected based on an evaluated risk. To select which customers will be audited, a risk evaluation model may be applied to the purchased order to evaluate a risk associated with the purchased order, such as, accuracy of payment, weight information of a purchased item, and the like. The risk evaluation model may be a machine learned model or an algorithmic model that includes a set of rules.

In some implementations, a machine learned risk evaluation model may be applied to each of the purchased items to output a risk score for the purchase indicating a level of risk associated with the purchase, i.e., a likelihood that the information associated with the purchase, such as, payment, weight, item, etc., is not accurate. In some cases, the online concierge system may input features that relate to the user engagement with the purchased items based on historical purchase data, such as an amount of items that an ordinary customer usually purchases or the specific customer usually purchases.

In some embodiments, the machine learned risk evaluation model may be trained with a training dataset. The training dataset may include a plurality of training examples, and each training example may include customer feature information and product feature information. The customer feature information may include the customer's previous purchase history, purchase pattern, payment information, frequency of purchase in a retailer store, and the like. The product feature information may include size, price per unit, amount of price saving, availability, popularity, item category, and the like. In some embodiments, the machined learned risk evaluation model may include a deep neural network, a regression model, a classifier, or any other suitable type of machine learning model.

In some embodiments, the risk evaluation model may output a risk score for the whole purchase. Alternatively, the risk evaluation model may highlight a risk score for a particular item in the order. Based on the determined risk score, the online concierge system may select the corresponding customers for verification. For example, the online concierge system may identify one or more purchases with a risk score above a threshold value (e.g., 85%) and select these purchases for verification. In some embodiments, the online concierge system may select a portion of the purchases for audit based on the determined risk scores. For example, the purchases having risk scores among the top 5% of the whole purchases in the retailer may be selected for verification.

In another implementation, the risk evaluation model may be rule based. For example, high-value items (e.g., electronic devices) may be determined to have a higher risk and assigned with a higher risk score. In one example, items that are measured by quantity or weight (e.g., produce) may be assigned with higher risk scores because the corresponding quantity information is more likely to be inaccurate compared to other types of product items. In another example, a first-time order in a retailer may be assigned with a higher risk score because no previous historical information is identified for the specific customer/retailer. The rules may include a location, time, category of the project items, account, amount (e.g., purchase amount), or any suitable parameter related to a purchase. In one example of a rule, a retailer may specify that a purchase is not required for verification for transaction amounts below 15 dollars for a grocery store. In another example of a rule, the retailer may specify that a purchase including any electronic device is required for verification. In some embodiments, a retailer may specify rules under which purchases are to be verified.

Figure 4:
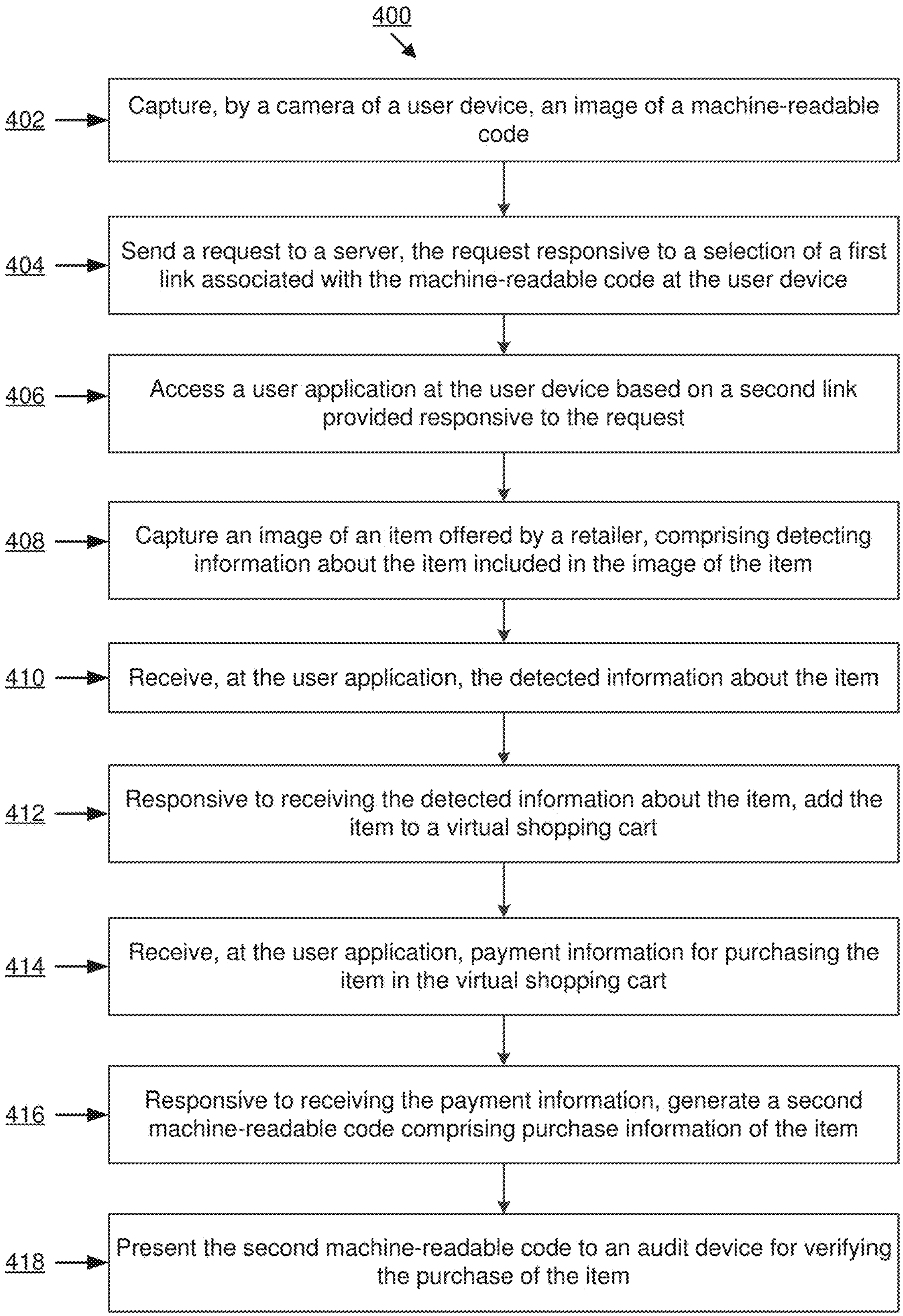
FIG. 4 is a flowchart for a method of using a scan and pay user application for self-checkout, in accordance with some embodiments.

FIG. 4 is a flowchart for a method 400 of using a scan and pay user application for self-checkout, in accordance with some embodiments. Alternative embodiments may include more, fewer, or different steps from those illustrated in FIG. 4, and the steps may be performed in a different order from that illustrated in FIG. 4. These steps may be performed by an online concierge system (e.g., online concierge system 140). Additionally, each of these steps may be performed automatically by the online concierge system without human intervention.

As shown in FIG. 4, a user device may capture 402 an image of a machine-readable code using a camera of the user device. In some embodiments, the machine-readable code may be a QR code. In some examples, a QR code may be displayed at a retailer. For example, the retailer may print the QR code on posters, handouts, receipts, packages, etc. Alternatively, the retailer may display the QR code on electronic devices.

Responsive to a selection of a link associated with the machine-readable code, the user device may send 404 a request to a server. Capturing the machine-readable code may cause a selection of a link associated with the machine-readable code, and trigger the user device to send a request to a server (e.g., an App store server).

The user device may access 406 a user application at the user device based on a second link provided responsive to the request. Responsive to the request, the user device may access a link and download a user application based on the link. Alternatively, the selection of the link associated with the machine-readable code may take the user device to a website accessed in a browser, and the website functions similarly as the user application.

The camera of the user device may capture 408 an image of an item offered by a retailer. In some embodiments, the image may include information about the item included in the image of the item, and by capturing the image of the item, the user device may detect the information about the item. In some embodiments, the user application may request a user's permission to access the camera on the user client device. In some embodiments, a user may point the camera at a barcode to scan the barcode associated with an item. The barcode may be printed on the package of the item, displayed on a print-out nearby, etc.

The user application may receive 410 the detected information about the item. In some embodiments, responsive to the camera of the user device scanning a barcode of an item, the user application may obtain information about the item and display the information in an item information card on a user interface provided by the user application. The item information card may include information of the scanned item, such as, price, size, image, etc. In some embodiments, the item information may be downloaded from cache, and in some embodiments, the item information may be loaded from the online concierge system server.

Responsive to receiving the detected information about the item, the user application may add 412 the item to a virtual shopping cart for purchase. In some embodiments, the user application may directly add the scanned item to the shopping cart; alternatively, the user application may allow the user to modify the scanned item before adding it to the shopping cart.

The user application may receive 414 payment information for purchasing the item in the virtual shopping cart. As a user proceeds to make a payment, for example, by clicking/tapping "place order," the user application may provide a payment interface that displays/requests payment information. For example, the user application may request the user to select a payment method, such as, checkout with credit card, buy with Apple Pay™, Google Pay™, and the like.

Responsive to receiving the payment information, the user application may generate 416 a second machine-readable code. The second machine readable code may include purchase information of the item, which includes at least the information about the item and the payment information. In some embodiments, the user application includes an image encoder which encodes the contents of the purchase into a machine-readable code, e.g., a QR code, which can then be scanned by an employee of the retailer at check-out. In one example, the generated machine-readable code may be included in the receipt presented in the user interface.

The user application may present 418 the second machine-readable code to a verification device (e.g., an audit device) for verifying the purchase of the item. The user application may direct a user to the audit station before leaving the retailer. In some embodiments, users may be randomly selected for verification (e.g., audit); in some embodiments, users may be selected based on an evaluated risk. To select which customers will be audited, a risk evaluation model may be applied to the purchased order to evaluate a risk associated with the purchased order. The risk evaluation model may be a machine learned model or an algorithmic model that includes a set of rules.

In one implementation, after a user places an order and checks out the purchase, the user will receive a receipt with a QR code and instructions to go to a receipt scan station. When the user arrives at the receipt scan station, the user may see a notification requesting the user to scan the QR code at the receipt scan station. If the user is not flagged for an audit, an exit screen will simply inform the user to exit. For example, the screen will show a number of items purchased and a successful purchase message.

In another example, when a user is flagged for an audit, a store associate may walk over to the receipt scan station with another device. For example, the device may be not on a stand, but instead physically held by the store associate. In some examples, the device may be logged into a store associate account, which has the unique capability of being able to view customer orders upon scanning a receipt QR code. The store associate may walk with the user away from the receipt scan station, freeing the station up for use by another user. The store associate will scan the QR code on the user's phone to load this user's order into the store associate's device, informing the system which user is under the audit.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

capturing, by a camera of a user device, an image of a first machine-readable code, wherein the first machine-readable code encodes a store identifier that identifies local store information of a retailer;

sending a request to a server, the request responsive to a selection of a first link associated with the first machine-readable code at the user device;

accessing a user application at the user device based on a second link provided responsive to the request, wherein accessing the second link comprises:

receiving location data captured by a location sensor of the user device, wherein the location data describes a location of the user device;

comparing the location of the user device to the local store information of the retailer;

determining whether the location of the user device matches the local store information of the retailer; and responsive to determining that the location does not match the local store information, transmitting default information for the retailer for display to the user through the user application;

capturing, by the camera of the user device, an image of an item offered by the retailer, wherein capturing the image comprises detecting information about the item included in the image of the item;

receiving, at the user application, the detected information about the item;

responsive to receiving the detected information about the item, by the user application, adding the item to a virtual shopping cart;

receiving, at the user application, payment information for purchasing the item in the virtual shopping cart;

responsive to receiving the payment information, generating, at the user application, a second machine-readable code comprising purchase information of the item, wherein the purchase information comprises at least a payment identifier;

presenting, by the user application, the second machine-readable code to a verification device for verifying the purchase of the item;

receiving, from the verification device, the second machine-readable code;

decoding the second machine-readable code to extract the payment identifier;

retrieving, from a database, user information and item information based on the payment identifier extracted from the decoded second machine-readable code;

applying the user information and the item information to a machine-learned risk evaluation model to determine a risk score for the purchase of the item, wherein the machine-learned risk evaluation model is trained by a plurality of training examples including user feature information and product feature information labeled with verification outcomes based on historical purchases of items by users;

determining whether the risk score is within a threshold value;

in response to the risk score within the threshold value, transmitting confirmation to the user device, causing the user device to present a message indicating that the purchase was verified; and in response to the risk score meeting the threshold value, transmitting an audit request to a store associate device.

2. The method of claim 1, further comprising:

responsive to the risk score meeting a threshold value, sending an audit request notification to the user application at the user device.

3. The method of claim 1, further comprising:

receiving, at the user device, a verification request notification that requests a verification of the purchase at the retailer; and displaying, by the user device, the second machine-readable code for the verification device to capture the second machine-readable code to obtain the purchase information of the item.

4. The method of claim 1, wherein accessing a user application at the user device based on a second link provided responsive to the request comprises:

obtaining a catalog of items offered by a local store of the retailer in the user application.

5. The method of claim 1, further comprising:

presenting a request, at the user application, requesting a user's permission to obtain a current location of the user.

6. The method of claim 1, wherein adding the item to a virtual shopping cart comprises:

sending a confirmation notification, by the user application, indicating the item is added to the virtual shopping cart.

7. The method of claim 1, wherein receiving the detected information about the item comprises:

displaying, at a user interface of the user application, an item information card comprising at least name, price and image of the item.

8. A computer program product comprising a non-transitory computer readable storage medium having instructions encoded thereon that, when executed by a processor, cause the processor to perform steps comprising:

capturing, by a camera of a user device, an image of a first machine-readable code, wherein the first machine-readable code encodes a store identifier that identifies local store information of a retailer;

sending a request to a server, the request responsive to a selection of a first link associated with the first machine-readable code at the user device;

accessing a user application at the user device based on a second link provided responsive to the request, wherein accessing the second link comprises:

receiving location data captured by a location sensor of the user device, wherein the location data describes a location of the user device;

comparing the location of the user device to the local store information of the retailer;

determining whether the location of the user device matches the local store information of the retailer; and responsive to determining that the location does not match the local store information, transmitting default information for the retailer for display to the user through the user application;

capturing, by the camera of the user device, an image of an item offered by the retailer, wherein capturing the image comprises detecting information about the item included in the image of the item;

receiving, at the user application, the detected information about the item;

responsive to receiving the detected information about the item, by the user application, adding the item to a virtual shopping cart;

receiving, at the user application, payment information for purchasing the item in the virtual shopping cart;

responsive to receiving the payment information, generating, at the user application, a second machine-readable code comprising purchase information of the item, wherein the purchase information comprises at least a payment identifier;

presenting, by the user application, the second machine-readable code to a verification device for verifying the purchase of the item;

receiving, from the verification device, the second machine-readable code;

decoding the second machine-readable code to extract the payment identifier;

retrieving, from a database, user information and item information based on the payment identifier extracted from the decoded second machine-readable code;

applying the user information and the item information to a machine-learned risk evaluation model to determine a risk score for the purchase of the item, wherein the machine-learned risk evaluation model is trained by a plurality of training examples including user feature information and product feature information labeled with verification outcomes based on historical purchases of items by users;

determining whether the risk score is within a threshold value;

in response to the risk score within the threshold value, transmitting confirmation to the user device, causing the user device to present a message indicating that the purchase was verified; and in response to the risk score meeting the threshold value, transmitting an audit request to a store associate device.

9. The computer program product of claim 8, the steps further comprising:

responsive to the risk score meeting a threshold value, sending an audit request notification to the user application at the user device.

10. The computer program product of claim 8, wherein the instructions further cause the processor to perform steps comprising:

receiving, at the user device, a verification notification that requests a verification of the purchase at the retailer; and displaying, by the user device, the second machine-readable code for the verification device to capture the second machine-readable code to obtain the purchase information of the item.

11. The computer program product of claim 8, wherein the instructions to access a user application at the user device based on a second link provided responsive to the request further cause the processor to perform steps comprising:

obtaining a catalog of items offered by a local store of the retailer in the user application.

12. The computer program product of claim 8, wherein the instructions further cause the processor to perform steps comprising:

presenting a request, at the user application, requesting a user's permission to obtain a current location of the user.

13. The computer program product of claim 8, wherein the instructions to add the item to a virtual shopping cart further cause the processor to perform steps comprising:

sending a confirmation notification, by the user application, indicating the item is added to the virtual shopping cart.

14. The computer program product of claim 8, wherein the instructions to receive the detected information about the item further cause the processor to perform steps comprising:

displaying an item information card comprising at least name, price and image of the item.

15. A computer system comprising:

a processor; and a non-transitory computer-readable storage medium having instructions that, when executed by the processor, cause the computer system to perform steps comprising:

capturing, by a camera of a user device, an image of a first machine-readable code, wherein the first machine-readable code encodes a store identifier that identifies local store information of a retailer;

sending a request to a server, the request responsive to a selection of a first link associated with the first machine-readable code at the user device;

accessing a user application at the user device based on a second link provided responsive to the request, wherein accessing the second link comprises:

receiving location data captured by a location sensor of the user device, wherein the location data describes a location of the user device;

comparing the location of the user device to the local store information of the retailer;

determining whether the location of the user device matches the local store information of the retailer; and responsive to determining that the location does not match the local store information, transmitting default information for the retailer for display to the user through the user application;

capturing, by the camera of the user device, an image of an item offered by the retailer, wherein capturing the image comprises detecting information about the item included in the image of the item;

receiving, at the user application, the detected information about the item;

responsive to receiving the detected information about the item, by the user application, adding the item to a virtual shopping cart;

receiving, at the user application, payment information for purchasing the item in the virtual shopping cart;

responsive to receiving the payment information, generating, at the user application, a second machine-readable code comprising purchase information of the item, wherein the purchase information comprises at least a payment identifier;

presenting, by the user application, the second machine-readable code to a verification device for verifying the purchase of the item;

receiving, from the verification device, the second machine-readable code;

decoding the second machine-readable code to extract the payment identifier;

retrieving, from a database, user information and item information based on the payment identifier extracted from the decoded second machine-readable code;

applying the user information and the item information to a machine-learned risk evaluation model to determine a risk score for the purchase of the item, wherein the machine-learned risk evaluation model is trained by a plurality of training examples including user feature information and product feature information labeled with verification outcomes based on historical purchases of items by users;

determining whether the risk score is within a threshold value;

in response to the risk score within the threshold value, transmitting confirmation to the user device, causing the user device to present a message indicating that the purchase was verified; and in response to the risk score meeting the threshold value, transmitting an audit request to a store associate device.

16. The computer system of claim 15, the steps further comprising:

receiving, at the user device, a verification request notification that requests a verification of the purchase at the retailer; and displaying, by the user device, the second machine-readable code for the verification device to capture the second machine-readable code to obtain the purchase information of the item.

17. The computer system of claim 15, wherein the first machine-readable code is associated with a store identifier that identifies local store information of the retailer.

18. The computer system of claim 15, wherein accessing a user application at the user device based on a second link provided responsive to the request comprises:

obtaining a catalog of items offered by a local store of the retailer in the user application.

* * * * *